T. J. MAYALL.
Composition for the Manufacture of Emery Sticks and Wheels.
No. 24,039. Patented May 17, 1859.
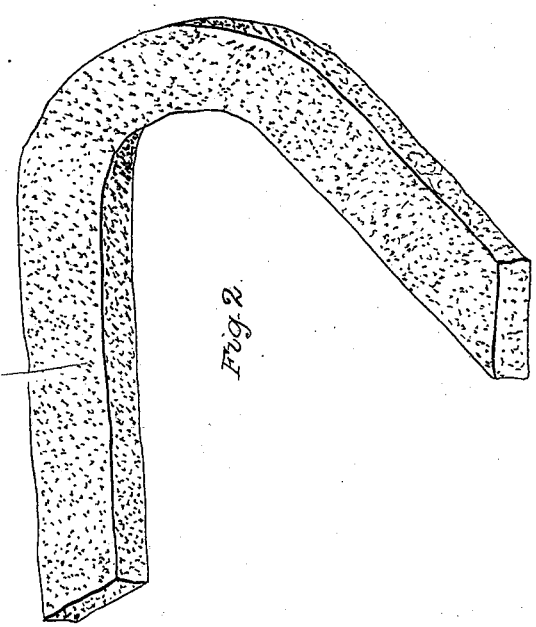
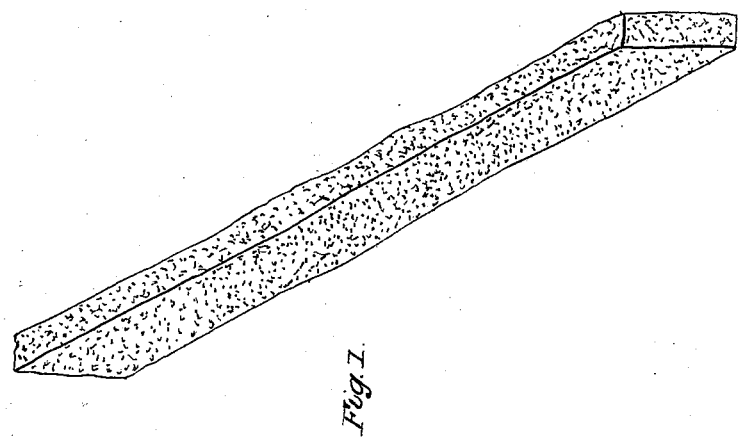
Witnesses
Joseph Gavett
Albert W. Brown
Inventor
T. J. Mayall

UNITED STATES PATENT OFFICE.

THOMAS J. MAYALL, OF ROXBURY, MASSACHUSETTS.

IMPROVEMENT IN COMPOSITION FOR EMERY STICKS AND WHEELS.

Specification forming part of Letters Patent No. 24,039, dated May 17, 1859.

*To all whom it may concern:*

Be it known that I, THOMAS J. MAYALL, of Roxbury, in the county of Norfolk and State of Massachusetts, have invented certain new and useful Improvements in a New Composition for the Formation of Emery-Wheels, Emery-Sticks, &c.; and I do hereby declare that the following description, taken in connection with the accompanying drawings, hereinafter referred to, forms a full and exact specification of the same, wherein I have set forth the nature and principles of my improvements, by which my invention may be distinguished from all others of a similar class, together with such parts as I claim and desire to have secured to me by Letters Patent.

The figures of the accompanying plate of drawings represent my improvements.

Figure 1 is a perspective view of a rigid emery-stick. Fig. 2 is a perspective view of a flexible emery-stick.

I have heretofore made an improvement in the manufacture of emery-wheels by using a composition of hard rubber and emery, for which Letters Patent were issued to me on the 11th day of January, 1859; but that composition is not perfect, and I have made a new, different, and improved composition, which consists of gutta-percha, sulphur, powdered emery, and olive-oil.

In preparing this composition I take gutta-percha and purify it from the oil which is combined with it in its native state, and which is injurious to my composition, either by heating it to expel this oil or by any other method. I then combine it in the proportion of eight pounds of gutta-percha to four pounds of sulphur. With this I mix forty pounds of powdered emery and half a pound of pure olive-oil. By this composition I am enabled to form a substance which combines with and holds the emery with the greatest firmness, and which can be molded and heated into any desired form. This composition is different from and has great advantages over india-rubber, particularly in the amount of sulphur which I am enabled to use; and as I am enabled to use a less amount of gum the wheels and sticks in use do not become gummed or clogged, but preserve their gritty and polishing surface. When these ingredients have been perfectly combined and mixed together, I place the composition in iron molds and heat it from six to seven hours at a temperature of 300° Fahrenheit, and the composition becomes hard, firm, and fit for use. I mold this composition before heating into the form of emery-wheels and emery-sticks for polishing, and any form of polishing-tools which may be required for use.

In using emery-sticks or polishing-tools an inconvenience is found by the workman on account of the stiffness of the ordinary tools, and to obviate this I have discovered a method of making flexible emery-sticks and polishing-tools which can be used on any curved or unequal surface and can be bent in using into any required shape. To make these flexible tools of gutta-percha, I take the same composition which is above described and take it from the heater when it has been heated to about the consistency of thick sheet-lead, so that it can be bent by the hand, and then will remain in the position to which it is bent. Under ordinary circumstances a temperature of about 260° is a suitable temperature to which the composition is to be exposed from six to seven hours; but it is found in this case, as in most processes of heating india-rubber and gutta-percha, that the heat must be varied very much, according to the materials used, and much must be left to the judgment of the workman, and I therefore do not limit myself to any particular degree of heat. The same result can be accomplished by heating the composition at a higher heat for a less time, and I have found that a heat of 300° for two hours and a half will accomplish similar results. I produce a similar flexible emery stick and tool by using india-rubber instead of gutta-percha, and in that case I use a composition of one pound of india-rubber, five ounces of sulphur, five pounds of emery, and one ounce of pure olive-oil. This composition I heat for six hours at a temperature of 280° Fahrenheit, or at a temperature of 300° Fahrenheit, for two hours; but I do not limit myself to these degrees of heat or periods of time, as they admit of considerable variation, my object being to produce a flexible tool which can be bent into any desired form and will remain in the shape to which it is bent, and with these instructions any workman of ordinary skill can produce the compound of the desired consistency and degree of flexibility. It will be found that these tools can be bent more easily by holding them for a short time before a fire, and can be restored to their former shape in the same way. The advantages of these are obvious. The sticks and tools can be made of any desired size or shape. A straight stick can be curved so as to polish a shaft or the inside of a cylinder or any oval surface, and a great saving of labor is accomplished.

I do not limit myself to the proportions of any of the compositions above described, as they will admit of considerable variation. I have given those which I have found the most useful.

Having thus described my improvements, I shall state my claim as follows.

What I claim as my invention, and desire to have secured to me by Letters Patent, is—

The composition for the manufacture of emery wheels, sticks, and tools of more or less flexible nature, formed of gutta-percha or india-rubber and sulphur, emery, and olive-oil, substantially in the manner and for the purposes set forth.

THOS. J. MAYALL.

Witnesses:
JOSEPH GAVETT,
ALBERT W. BROWN.